(12) United States Patent
LaPierre

(10) Patent No.: US 7,330,834 B1
(45) Date of Patent: Feb. 12, 2008

(54) SYSTEM AND METHOD FOR ELECTRONIC TRADING OF ASSETS

(75) Inventor: Steven A. LaPierre, Washington Crossing, PA (US)

(73) Assignee: Novaplex Technologies, Inc., Langhorne, PA (US)

( * ) Notice: Subject to any disclaimer, the term of this patent is extended or adjusted under 35 U.S.C. 154(b) by 702 days.

(21) Appl. No.: 09/679,813

(22) Filed: Oct. 5, 2000

(51) Int. Cl.
*G06Q 40/00* (2006.01)

(52) U.S. Cl. .......................................... 705/37; 705/35
(58) Field of Classification Search ................. 705/37, 705/32, 26, 28
See application file for complete search history.

(56) References Cited

U.S. PATENT DOCUMENTS

| | | | | |
|---|---|---|---|---|
| 5,375,055 A | * | 12/1994 | Togher et al. ................. | 705/37 |
| 5,689,652 A | * | 11/1997 | Lupien et al. ................. | 705/37 |
| 5,732,400 A | * | 3/1998 | Mandler et al. ............... | 705/26 |
| 5,809,144 A | * | 9/1998 | Sirbu et al. .................... | 705/53 |
| 5,845,265 A | * | 12/1998 | Woolston ...................... | 705/37 |
| 5,845,266 A | * | 12/1998 | Lupien et al. ................. | 705/37 |
| 5,862,223 A | * | 1/1999 | Walker et al. ................. | 705/50 |
| 5,893,076 A | * | 4/1999 | Hafner et al. ................. | 705/28 |
| 5,895,454 A | * | 4/1999 | Harrington .................... | 705/26 |
| 5,905,975 A | * | 5/1999 | Ausubel ........................ | 705/37 |
| 5,918,218 A | * | 6/1999 | Harris et al. .................. | 705/37 |
| 5,950,176 A | * | 9/1999 | Keiser et al. .................. | 705/37 |
| 5,950,177 A | * | 9/1999 | Lupien et al. ................. | 705/37 |
| 5,963,915 A | * | 10/1999 | Kirsch .......................... | 705/26 |
| 5,963,923 A | * | 10/1999 | Garber ......................... | 705/37 |
| 5,974,395 A | * | 10/1999 | Bellini et al. ................. | 705/9 |
| 6,014,627 A | * | 1/2000 | Togher et al. ................. | 705/1 |
| 6,195,646 B1 | * | 2/2001 | Grosh et al. .................. | 705/26 |
| 6,401,211 B1 | * | 6/2002 | Brezak et al. ................ | 713/201 |
| 6,505,174 B1 | * | 1/2003 | Keiser et al. .................. | 705/37 |
| 6,584,502 B1 | * | 6/2003 | Natarajan et al. ........... | 709/224 |
| 6,662,221 B1 | * | 12/2003 | Gonda et al. ................ | 709/223 |
| 2001/0032163 A1 | * | 10/2001 | Fertik et al. ................... | 705/37 |
| 2002/0032579 A1 | * | 3/2002 | Harpale ........................ | 705/1 |
| 2002/0128952 A1 | * | 9/2002 | Melkomian et al. .......... | 705/37 |
| 2002/0133449 A1 | * | 9/2002 | Segal et al. .................... | 705/37 |
| 2003/0037072 A1 | * | 2/2003 | Bowman et al. ............. | 707/201 |
| 2003/0115132 A1 | * | 6/2003 | Iggland ........................ | 705/37 |
| 2003/0126068 A1 | * | 7/2003 | Hauk et al. ................... | 705/37 |

FOREIGN PATENT DOCUMENTS

| | | | |
|---|---|---|---|
| WO | WO 01/14994 A2 | * | 3/2001 |
| WO | WO 01/25995 A1 | * | 4/2001 |
| WO | WO 01/37509 A2 | * | 5/2001 |
| WO | WO 01/75731 A1 | * | 10/2001 |

OTHER PUBLICATIONS

Mavrides, M. J: The Efficiency of Triangular Arbitrage in the Foreign Exchange Market: 1991 University of Illinois at Chicago (0799); vol. 5206A.*

* cited by examiner

*Primary Examiner*—Hani M. Kazimi
*Assistant Examiner*—Olabode Akintola
(74) *Attorney, Agent, or Firm*—Morgan Lewis & Bockius LLP

(57) ABSTRACT

A method for online trading of assets via transactionally linked virtual markets comprising the steps of defining attributes and behaviors of each of the virtual markets; placing individual buy or sell orders in each of the virtual markets; optionally defining trading strategies that will each span at least two virtual markets; calculating a price and amount for each order in the virtual markets defined by a trading strategy; generating an order in each of the virtual markets contained within a trading strategy; and matching and executing both the individual orders and orders generated by the defined trading strategies.

19 Claims, 17 Drawing Sheets

FX Arbitrage Strategy

Required ROI: 1/10 % (44% annualized)
Profit Location: USD Spot

| | | | | | | | |
|---|---|---|---|---|---|---|---|
| 1 | A) EUR/USD | Sell | 1.0235 | 1,000,000 | (C.BestPrice / B.BestPrice) x 1.001 | 1.02380514 | 2,000,000 |
| 2 | B) USD/JPY | Sell | 103.15 | 3,000,000 | (C.BestPrice / A.BestPrice) x 1.001 | 103.180752 | 1,022,386 |
| 3 | C) EUR/JPY | Buy | 105.50 | 2,000,000 | (A.BestPrice x B.BestPrice) / 1.001 | 105.468556 | 1,000,000 |

| Application Layer / Layer 5 |
| --- |
| 202 |
| Transport Layer / Layer 4 |
| 204 |
| Internet Layer / Layer 3 |
| 206 |
| Network Interface Layer / Layer 2 |
| 208 |
| Physical Layer / Layer 1 |
| 210 |

TCP/IP Layering Model

Fig. 2

System 300
Independent Host Site

System 400
Enterprise Trading Network

Global Trading Network

Figure 7

Market Definitions

| A) EUR/USD Spot FX | 1 | BUY | EUR | Spot Date (T+2) | 1 |
|---|---|---|---|---|---|
| | 2 | SELL | USD | Spot Date (T+2) | Trade pric |
| B) USD/JPY Spot FX | 1 | BUY | USD | Spot Date (T+2) | 1 |
| | 2 | SELL | JPY | Spot Date (T+2) | Trade pric |
| C) EUR/JPY Spot FX | 1 | BUY | EUR | Spot Date (T+2) | 1 |
| | 2 | SELL | JPY | Spot Date (T+2) | Trade pric |

Figure 8
Initial Orders

| A) EUR/USD Spot FX | 1 | 101 | BUY | 1,000,000 | 1.0235 |
| --- | --- | --- | --- | --- | --- |
| | 2 | 102 | SELL | 1,000,000 | 1.0245 |
| B) USD/JPY Spot FX | 3 | 103 | BUY | 3,000,000 | 103.15 |
| | 4 | 104 | SELL | 7,000,000 | 103.25 |
| C) EUR/JPY Spot FX | 5 | 105 | BUY | 1,000,000 | 105.40 |
| | 6 | 106 | SELL | 2,000,000 | 105.50 |

State Of Markets Following Placement Of Initial Orders

Figure 10

FX Arbitrage Strategy

Required ROI: 1/10 % (44% annualized)
Profit Location: USD Spot

| | | | | | | |
|---|---|---|---|---|---|---|
| 1 | A)<br>EUR/USD | Sell | 1.0235 | 1,000,000 | (C.BestPrice / B.BestPrice) x 1.001 | 1.02380514 | 2,000,000 |
| 2 | B)<br>USD/JPY | Sell | 103.15 | 3,000,000 | (C.BestPrice / A.BestPrice) x 1.001 | 103.180752 | 1,022,386 |
| 3 | C)<br>EUR/JPY | Buy | 105.50 | 2,000,000 | (A.BestPrice x B.BestPrice) / 1.001 | 105.468556 | 1,000,000 |

Figure 11

Market A Calculated Order Amount

EUR Spot

| C1 | | A1 |
|---|---|---|
| 2,000,000 | 2,000,000 | |

USD Spot

| A2 | | B1 |
|---|---|---|
| 2,047,800 | 2,045,564.712 | |

JPY Spot

| B2 | | C2 |
|---|---|---|
| 211,000,000 | 211,000,000 | |

Figure 12

Market B Calculated Order Amount

EUR Spot

| C1 | A1 |
|---|---|
| 1,000,000 | 1,000,000 |

USD Spot

| A2 | B1 |
|---|---|
| 1,023,500 | 1,022,385.89 |

JPY Spot

| B2 | C2 |
|---|---|
| 105,500,000 | 105,500,000 |

Figure 13

Market C Calculated Order Amount

EUR Spot

| C1 | A1 |
|---|---|
| 1,000,000 | 1,000,000 |

USD Spot

| A2 | B1 |
|---|---|
| 1,023,500 | 1,022,394.571 |

JPY Spot

| B2 | C2 |
|---|---|
| 105,460,000 | 105,460,000 |

Figure 14

Orders Generated By FX Arbitrage Strategy

| | | | | |
|---|---|---|---|---|
| A) EUR/USD Spot FX | 7 | 107 | SELL | 2,000,000 | 1.0239 |
| B) USD/JPY Spot FX | 8 | 107 | SELL | 1,022,386 | 103.19 |
| C) EUR/JPY Spot FX | 9 | 107 | BUY | 1,000,000 | 105.36 |

Figure 15

State Of Markets Following Activation Of FX Arbitrage Strategy

Market A (EUR/USD Spot FX)

| 1 | 1,000,000 | | 1.0245 | 2,000,000 | 7 |
| | | | | 1,000,000 | 2 |

Market B (USD/JPY Spot FX)

| 3 | 3,000,000 | | | 1,022,386 | 8 |
| | | | 103.25 | 7,000,000 | 4 |

Market C (EUR/JPY Spot FX)

| 9 | 1,000,000 | | | 2,000,000 | 6 |
| 5 | 1,000,000 | | 105.40 | | |

Figure 16

New Order Which Triggers Execution Of
FX Arbitrage Strategy

| A) EUR/USD Spot FX | 10 | 110 | BUY | 2,000,000 | 1.0239 |

Figure 17

Trades Generated By Execution Of

FX Arbitrage Strategy

| | | | | | | | | |
|---|---|---|---|---|---|---|---|---|
| A) EUR/USD Spot FX | 1 | 10 | 110 | 7 | 107 | 2,000,000 | 1.0239 |
| B) USD/JPY Spot FX | 2 | 3 | 103 | 8 | 107 | 2,045,564 | 103.15 |
| C) EUR/JPY Spot FX | 3 | 9 | 107 | 6 | 106 | 2,000,000 | 105.50 |

SYSTEM AND METHOD FOR ELECTRONIC TRADING OF ASSETS

FIELD OF THE INVENTION

The present invention relates to an on-line system and method for the trading of assets via virtual electronic markets that efficiently match counterparties in a trading transaction.

BACKGROUND OF THE INVENTION

Advances in computer processing power and network communications have made information from a wide variety of sources available to users on computer networks. Computer networking allows network computer users to share information, software applications and hardware devices and internetworking enables a set of physical networks to be connected into a single network such as the Internet. Today, computers connected to the Internet have almost instant access to information stored in relatively distant regions. Moreover, computers connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, graphical, audio, and animation information. Currently, Internet users retrieve information from the Internet, through the Web, by 'visiting' a web site on a computer that is connected to the Internet.

The web site is, in general terms, a server application that displays information stored on a network server computer. The web site accepts connections from client programs, such as Internet browser applications. Browser applications, such as Microsoft Internet Explorer™ or Netscape Navigator™, allow Internet users to access information displayed on the web site. Most browser applications display information on computer screens and permit a user to navigate through the Web using a mouse. Like other network applications, Web browsing uses the client-server paradigm. When given the Uniform Resource Locator (URL) of a document, the browser application becomes a client and it contacts a server application specified in the URL to request the document. After receiving the document from the server application, the browser application displays the document for the user. When the browser application interacts with the server application, the two applications follow the HyperText Transport Protocol (HTTP). HTTP allows the browser application to request a specific article, which the server application then returns. To ensure that browser applications and server applications inter-operate unambiguously, HTTP defines the exact format for requests sent from the browser application to the server application as well as the format of replies that the server application returns.

As the number of physical networks connected to the Internet continues to grow, so too will the number of web sites that are accessible to Internet users and so too will commercial and financial activity on the Internet.

In recent years online electronic trading systems have emerged as an efficient means to trade financial securities, commodities and other assets. These "virtual" markets attempt to amass the orders of many buyers and sellers to generate continuous liquidity.

Despite the vast amount of resources that have been dedicated to the development of online electronic trading systems, the existing implementations all suffer from various design flaws. For example, in most systems trading is only permitted in predefined, inflexible markets. Thus, new, custom-designed financial derivatives and other assets with complex structures cannot be accommodated without making modifications to the trading system software code itself. Another weakness in many existing systems is the fact that order matching is periodic, rather than continuous. Since orders are only matched at specified intervals, traders are at risk to adverse market movements between matching cycles, a span of more than one hour in some systems.

In most existing systems, the order matching process requires some form of third-party human intervention between the buyer and seller. Therefore, it is impossible to guarantee the anonymity of the buyer and seller. This need for human intervention also makes the process inherently unscalable. In a similar vein, order size cannot be effectively hidden from other users of the present systems, making it difficult or impossible to place very large buy or sell orders without causing adverse price movements.

A limitation common to all existing systems is that orders placed in two or more separate markets are isolated from each other. While this model of operation is satisfactory for the processing of unrelated individual orders, it does not support more sophisticated trading strategies that require the simultaneous execution of two or more related orders in different markets. Since individual markets are not linked in any transactional way, it is impossible to guarantee atomic execution of the strategy's underlying orders. If a user attempts to execute a strategy by executing orders individually he risks a partial execution scenario. For example, consider the case in which the user determines that the current prices and sizes of existing buy and sell orders in the markets that make up a given strategy meet the strategy's profit, price and size relationship constraints. The user begins executing the individual orders in their respective markets. However, before the user can complete execution of all the orders that make up the strategy, the best available price in one or more of the remaining markets changes adversely, resulting in the reduction or elimination of the strategy's profitability.

Clearly, the current state of the art in online electronic trading systems leaves much room for improvement. What is needed, therefore, is a system that allows ad hoc creation of new assets and markets, that continuously, automatically and anonymously matches buy and sell orders in these markets, and that enables guaranteed, atomic execution of trading strategies that span multiple markets and that have arbitrarily complex inter-market order price and size relationship constraints.

SUMMARY OF THE INVENTION

Accordingly, the present invention is directed to a method and system that substantially obviates one or more of the problems due to limitations and disadvantages of the related art. The present invention provides an online electronic system for trading assets by simultaneously operating large numbers of transactionally linked virtual electronic markets. The system includes means for defining the attributes and behaviors of these markets, routing and matching individual buy and sell orders for these markets, as well as means for implementing trading strategies that consist of sets of orders spanning multiple markets and that define arbitrarily complex inter-market order price and size relationship constraints. The system includes multiple client systems, access control servers, order routing servers and strategy servers, as well as multiple market servers, each operating on behalf of a specific market.

It is an object of the invention to provide a market creation mechanism that will enable users to specify the attributes and algorithms that uniquely identify a market and that govern the market's order processing behavior. The virtual markets defined using this mechanism may have attributes and behaviors that exactly replicate those of existing conventional markets such as the market for shares of IBM on the NYSE, or they may be entirely new markets designed to support the trading of complex, custom-engineered financial derivatives.

It is another object of the invention to include a collection of simultaneously active market servers in the system. Each of these market servers will be dedicated to supporting the operation of a specific virtual market created using the invention's market creation mechanism. Each market server will continuously match new incoming orders for its virtual market against existing counterorders for the same market.

It is another object of the invention to include a mechanism that allows users of the system to create buy or sell orders related to the virtual markets operating within the system. As part of the order creation process the user will be able to specify the total size of the order, the minimum allowable size for any partial executions of the order, the price of the order, and the portion of the total size of the order that the user wishes to make visible to other users of the system.

It is another object of the invention to provide a strategy creation mechanism that will enable users to specify the type of trading strategy desired (such as arbitrage, basket, etc.), the markets involved in the strategy, and the algorithms which define the price and amount conditions required for execution of the strategy.

It is another object of the invention to include a collection of simultaneously active strategy servers in the system. These strategy servers will automatically generate new orders or modify existing orders on behalf of the strategies that they manage in response to changes in the markets that make up those strategies.

It is another object of the invention to enable the market servers to work in conjunction with the strategy servers to control and coordinate the matching and execution of orders in a way that guarantees the atomic execution of strategies.

It is another object of the invention to provide an external liquidity source connector mechanism that will enable users to link virtual markets defined within the system to existing external conventional markets (such as markets in stocks listed on the NASDAQ) which provide electronic interfaces for online order routing and execution notification. External markets will be mapped to internal virtual markets via these connectors, providing transparent matching of orders originating internally with those originating in external systems.

It is another object of the invention to include an order validation mechanism. This mechanism will allow local host sites to establish various trading limits for each of their accounts, and will validate new orders against these limits before allowing the orders to be routed to their respective markets for matching.

It is another object of the invention to include a host site credit limit validation mechanism. This mechanism will allow local host sites operating within a linked, multi-site environment to establish mutual lines of credit for specified markets. Whenever an attempt is made to match two orders originating from different local host sites, these credit lines will be checked to determine any limitations on the amount to be matched.

It is another object of the invention to include a mechanism which allows two or more local host sites to be linked in a way that will enable orders originating from one host site to be matched against counterorders originating from another host site. The host site credit limit validation mechanism will allow each host to effectively guarantee the orders placed by the accounts under its control, making it possible to transparently match orders from different host sites without revealing the account-specific information that would otherwise be necessary to verify the creditworthiness of the respective accounts to each other.

It is another object of the invention to include a collection of simultaneously active access control servers in the system. The access control servers authenticate the identity of each user who wishes to access the system and determine the authorized level of system access that has been granted to the user before allowing the user access to other parts of the system.

It is another object of the invention to include a collection of simultaneously active order routing servers in the system. The order routing servers utilize the order validation mechanism to validate each new order entered into the system before further processing occurs on the order. The order routing servers also determine which market the order is for and then submit the order to the appropriate market server for processing.

It is another object of the invention to enable the various server systems to publish current order information, trade execution notifications, and other real-time information to users of the system. While the user is logged onto the client system, the user is able to see messages published to that system.

Additional features and advantages of the invention will be set forth in the description that follows, and in part will be apparent from the description, or may be learned by practice of the invention. The objectives and advantages of the invention will be realized and attained by the on-line trading system that is particularly pointed out in the written description and claims hereof as well as the appended drawings.

To achieve these and other advantages and in accordance with the purpose of the invention, as embodied and broadly described, the present invention a method for online trading of assets via transactionally linked virtual markets comprising the steps of: defining attributes and behaviors of each of the virtual markets; placing individual buy or sell orders in each of the virtual markets; optionally defining trading strategies that will each span at least two virtual markets; calculating a price and amount for each order to be generated by a trading strategy; generating orders for each of the virtual markets defined by each trading strategy and routing those orders to their respective virtual markets; and matching and executing both individual orders and orders generated by trading strategies in such a way that atomic execution of trading strategies is guaranteed.

The present invention also provides a system for online trading of assets via transactional linked virtual markets comprising: a market creation mechanism to enable users to create a plurality of virtual markets; a plurality of active market servers to support the operation of each of the created virtual markets; an order creation mechanism to allow users to create buy or sell orders related to the virtual markets; a strategy creation mechanism to enable users to specify trading strategies for the virtual markets; a plurality of active strategy servers to generate new orders on behalf of the specified trading strategies and to coordinate with the plurality of active market servers to insure atomic execution of the trading strategies; and a linking mechanism to enable orders and counterorders from different servers to be linked.

The present invention also provides a system for online trading of assets via transactional linked virtual markets comprising: a plurality of client systems for entering orders by a client; a plurality of order routers for determining which market from an existing plurality of markets the order is in and transmitting the order to a market server; a plurality of market servers for matching the order with existing counterorders and monitoring the plurality of markets; and a plurality of strategy servers for generating new orders, and routing the generated orders to each market defined in a trading strategy and coordinating with the plurality of market servers to insure atomic execution of all orders that make up the trading strategy.

It is to be understood that both the foregoing general description and the following detailed description are exemplary and explanatory and are understood to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 7 illustrates the detailed definitions of the markets referenced in the demo scenario.

FIG. 8 illustrates the initial orders to be placed in the markets referenced in the demo scenario.

FIG. 10 illustrates the detailed definition of the trading strategy referenced in the demo scenario.

FIGS. 11-13 illustrate the proposed individual market payments that were generated to calculate the amounts of each order in the trading strategy referenced in the demo scenario.

FIG. 14 illustrates the details of the orders generated by the trading strategy referenced in the demo scenario.

FIG. 15 illustrates the state of the markets referenced in the demo scenario after the orders pictured in FIG. 14 have been processed by their respective markets.

FIG. 16 illustrates the details of a new incoming order that will trigger execution of the trading strategy referenced in the demo scenario.

FIG. 17 illustrates the details of the three trades generated by the execution of the trading strategy referenced in the demo scenario.

DESCRIPTION OF THE PREFERRED EMBODIMENTS

Reference will now be made in detail to the preferred embodiments of the present invention, examples of which are illustrated in the accompanying drawings. The present invention described below extends the functionality of the inventive system and method for online electronic trading of assets.

Figure 1:
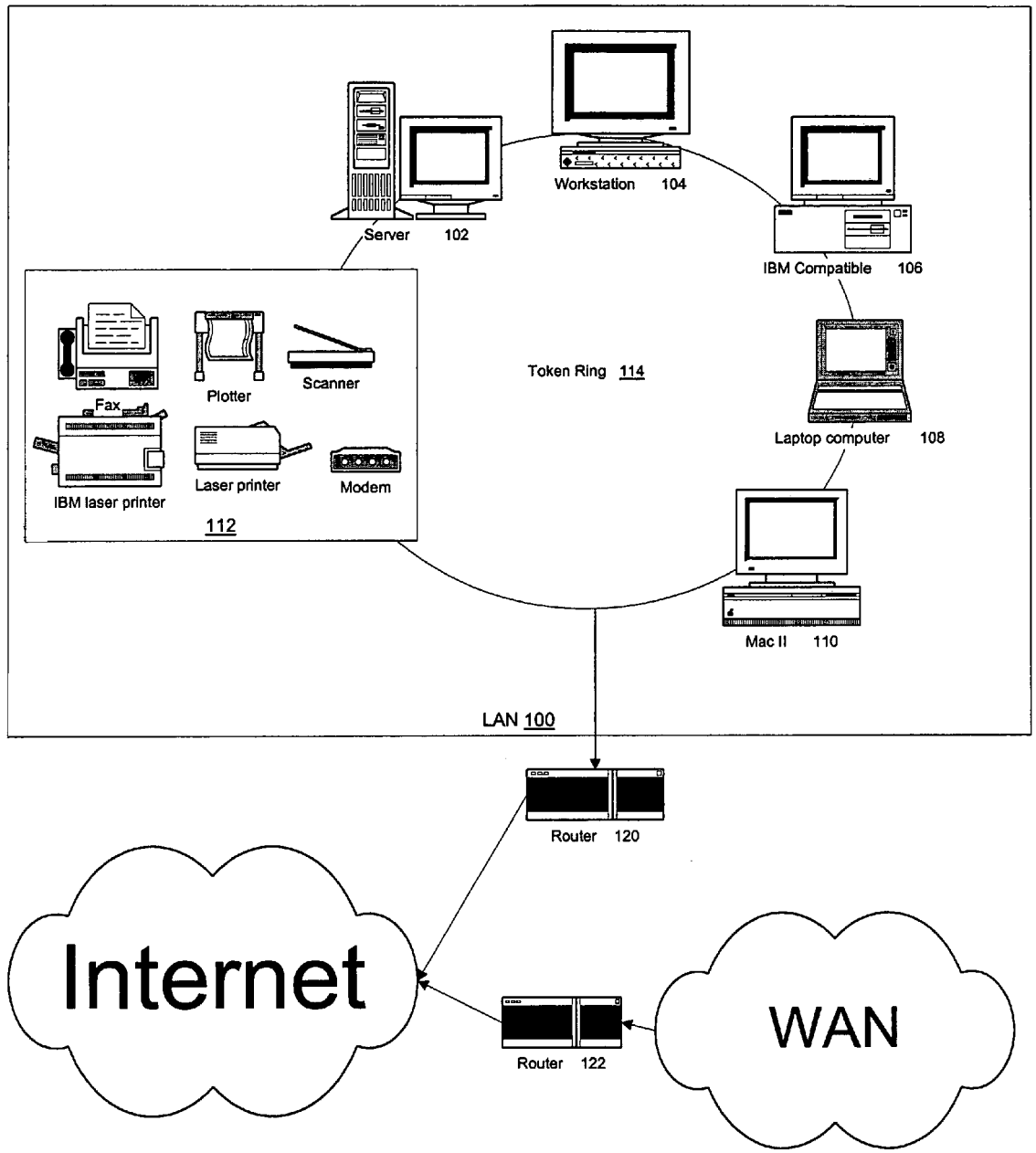
FIG. 1 illustrates an example of a local area network (LAN) 100 that is connected to the Internet and in which the inventive system and method may be utilized.

FIG. 1 illustrates an example of a local area network (LAN) 100 that is connected to the Internet and in which the inventive system and method may be utilized. LAN 100 comprises a server 102, four computer systems 104, 106, 108, 110, and peripherals, such as printers and other devices 112, that may be shared by components on LAN 100. Computer systems 104, 106, 108, 110 may serve as clients for server 102 and/or as clients and/or servers for each other and/or for other components connected to LAN 100. Components on LAN 100 are preferably connected together by cable media, for example unshielded twisted pair (UTP) Category 5 copper cable, and the network topology may be an Ethernet topology 114. It should be apparent to those of ordinary skill in the art that other media, for example, fiber optic or wireless radio frequency media, may also connect LAN 100 components. It should also be apparent that other network topologies, such as Token Ring, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and router 304s that connect them must adhere to a standard protocol. Computer networks connected to the Internet and to other networks typically use TCP/IP Layering Model Protocol. It should be noted that other internetworking protocols may be used.

Figure 2:
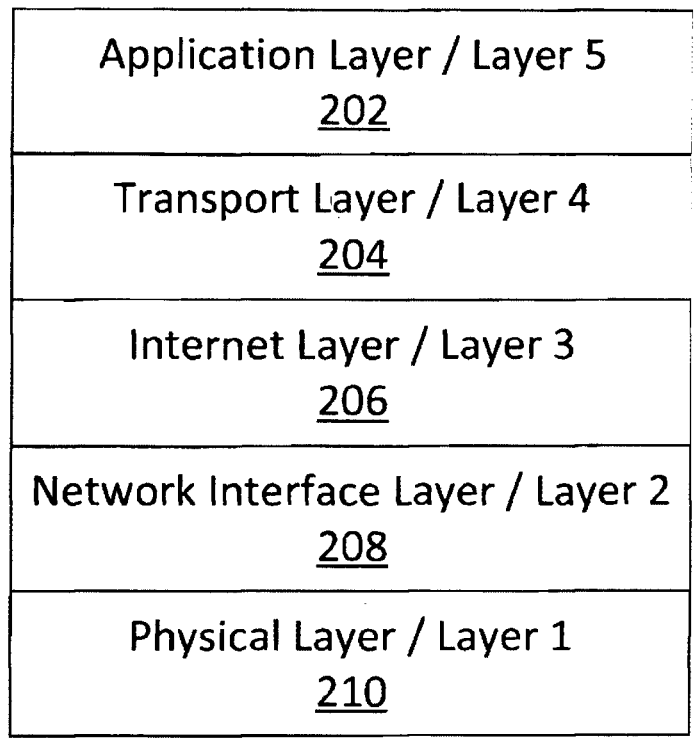
FIG. 2 illustrates the TCP/IP Layering Model.
Figure 3:
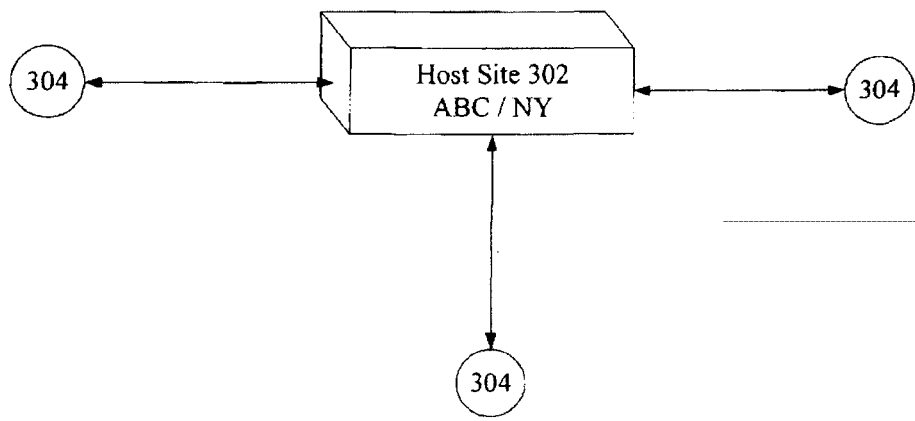
Figure 4:
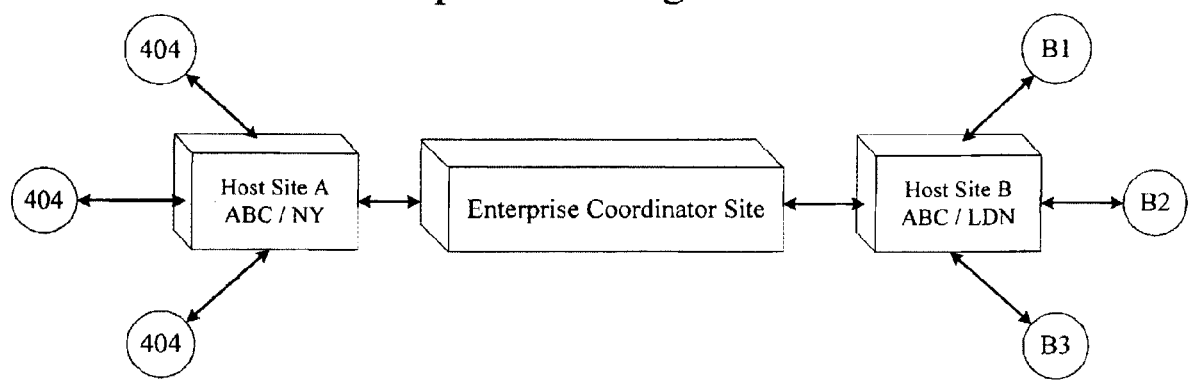
Figure 5:
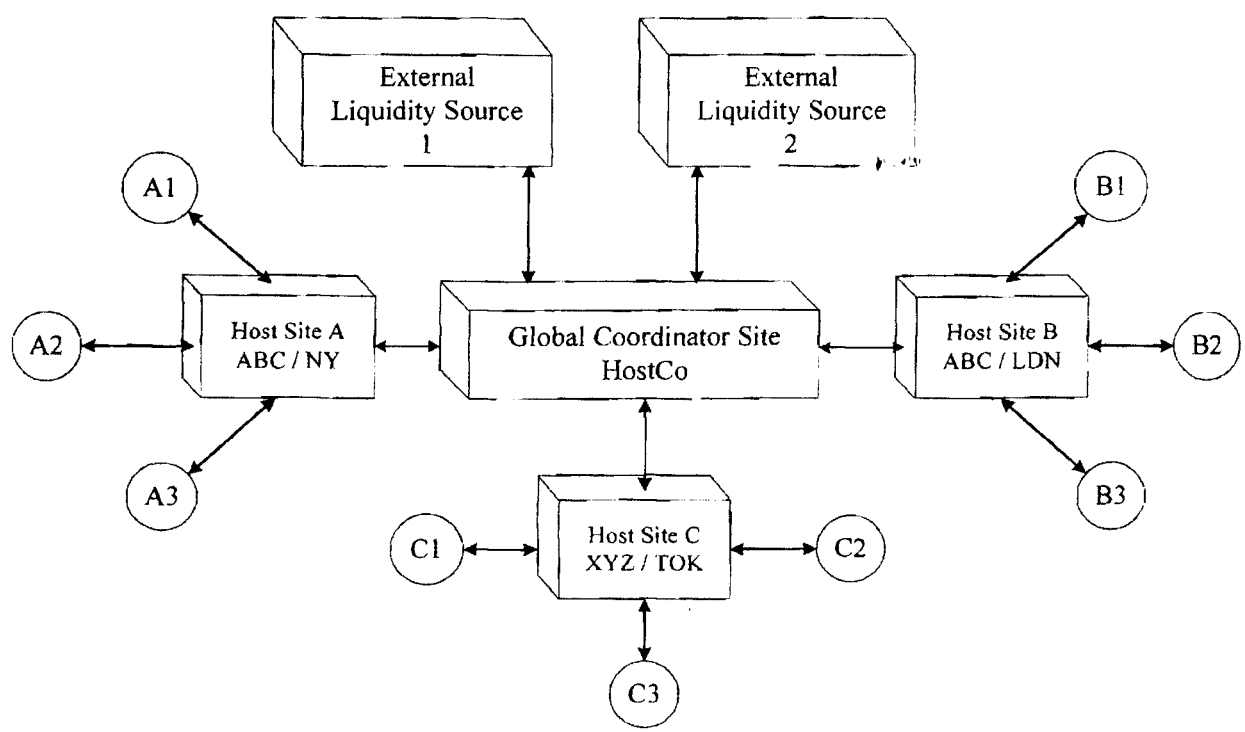
Figure 6:
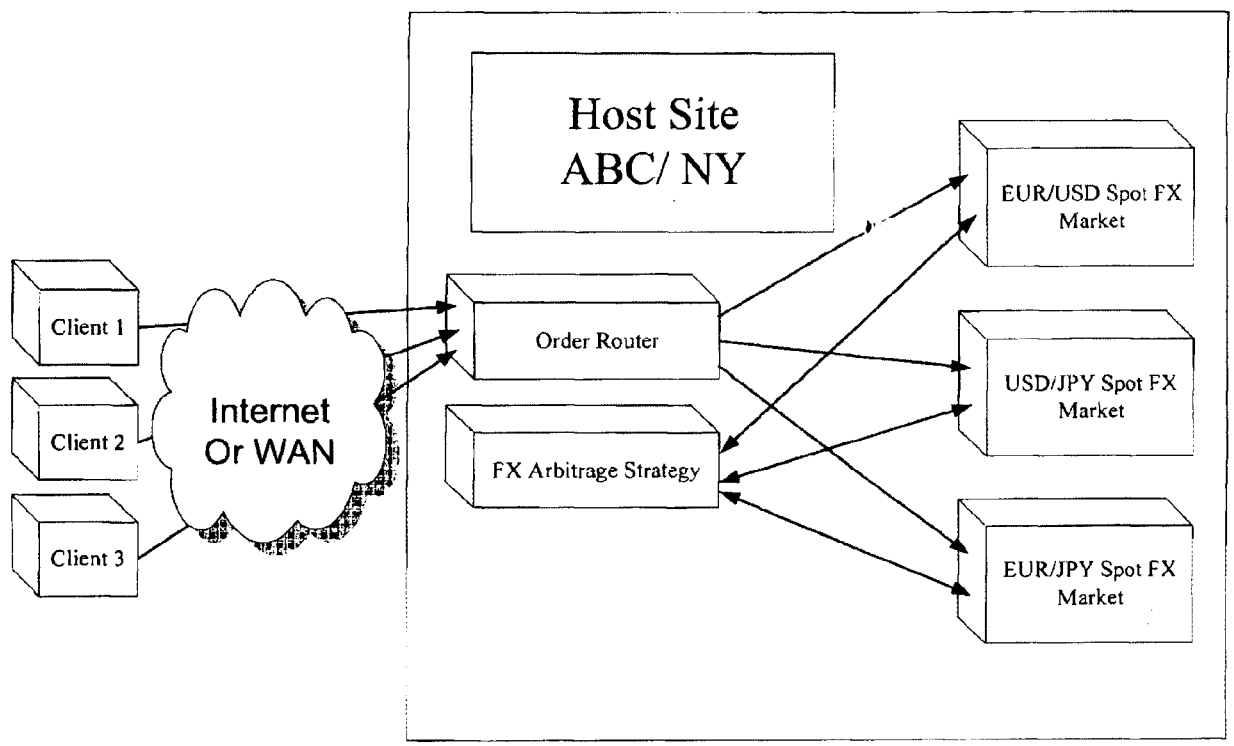

FIG. 2 illustrates the TCP/IP Layering Model, which is comprised of an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

The present invention employs a set of logical entities referred to as Business Objects. Each business object is a logical representation of a real-world business concept. These business objects are implemented in computer software code that defines the attributes and behavior of each object. The main business objects that comprise the invention are as follows:

An Asset is anything of value, including tangible goods, money, services, deeds and promissory notes.

A Party is a person, group of people, company or other legal entity.

A Payment is the transfer of legal ownership of an asset from one party to another. The date on which the transfer of asset ownership related to a payment takes legal effect is the payment date. Each payment has a side, which identifies it as either a buy payment or a sell payment.

A Trade is a legally binding contractual obligation between two parties to exchange a specific series of payments. The buyer of the trade is the party that will receive each of the buy payments from the seller. Conversely, the seller is the party that will receive each of the sell payments from the buyer.

An Account is a logical structure that links a party (the account owner) to a specific set of trades. A given party may own several accounts, but any given trade is always between exactly two accounts—one representing the buyer and the other representing the seller.

A single implementation of the online electronic trading system is referred to as a Local Host Site.

Multiple local host sites may be linked together within a Global Host Site. The trading accounts within a given local host site are referred to as the site's Local Accounts. Each local account is a member of one, and only one, local host site.

Counterparties are accounts on opposite sides of a trade; i.e. the seller of a trade is a counterparty to the buyer, and the buyer is a counterparty to the seller.

An Order is a formal expression of a party's desire to enter into a trade with a counterparty under specified conditions. The attributes of an order include an account, a market, a side indicator (buy or sell), a price and a size.

An order also has a Lifespan, which specifies the length of time that the order should remain active in the system. Examples of possible order lifespans are Good-Til-Cancelled (the order is active until completely filled or explicitly cancelled), Day (the order is only active until the end of the current trading day), and Fill-Or-Kill (the market will attempt to execute the order only once, at the time the order is placed, then cancel any remaining amount in the order).

Counterorders are orders for the same market having opposite sides; i.e. the counterorder to a buy order is a sell order, and the counterorder to a sell order is a buy order.

A Match exists between two counterorders when the Price of the Buy Order is greater than or equal to the Price of the Sell Order.

A Market is a structure that serves three distinct but interrelated purposes: 1) To define the assets, sides (Buy or Sell) and payment dates of a specific series of payments between two counterparties; 2) To define the formulae used to calculate the payment factors for these payments. Each payment has its own payment factor formula. The order price is used as an input to each formula, which derives a payment factor for its respective payment. The order size is then multiplied by each payment factor to determine the amount of the respective payment; and 3) to process new orders, identify any order matches and generate the resulting trades.

Examples of Markets are a spot foreign exchange market for exchanging currencies, a market to trade options, interest rates, futures, commodities. Other Markets will be known to those skilled in the art, and are within the scope of the present invention.

Each market maintains a list of existing unmatched buy orders and a list of existing unmatched sell orders. These lists are collectively known as the market's Order Book.

When a new order is transmitted to its respective market, the market attempts to match the new order with an existing counterorder from its order book. If a match is found then a new trade is generated. If no match is found, then the new order is added to the appropriate side of the market's order book.

A trading Strategy defines a list of strategy items, each of which specifies a market, an order side (buy or sell) for that market, a price formula specifying the required mathematical relationships between the price of an order in the item's market and the prices of the orders in each of the markets referenced by the other items contained within the strategy, and an amount formula specifying the required mathematical relationships between the amount of an order in the item's market and the amounts of the orders in each of the markets referenced by the other items contained within the strategy. In order for a strategy to be executed, all of the required mathematical relationships between the prices and sizes of the orders in the strategy's markets must be in effect, and the strategy's execution must be atomic; i.e. either all of the orders that make up the strategy must be executed, or none should be executed. Examples of types of trading strategies include the following:

1) Basket Strategies. A basket strategy is defined as a set of strategy items in two or more markets where each item has the same side (buy or sell), each market is a simple exchange market (buy one asset in exchange for another), and each of the markets shares a common asset. The required price and amount relationships between the items that make up the strategy are implied by specifying a target price for the entire strategy and a weighting factor between zero and one for each item. One familiar example of a basket strategy would be a strategy that specifies a set of thirty buy items, each corresponding to an individual market for equity shares in a company that is part of the Dow Jones Industrial average. The amount weighting assigned to each item would be the same weighting used to calculate the DJIA, and the strategy would specify the U.S. Dollar price that the strategy's creator is willing to pay in order to purchase the entire basket of thirty stocks. The prices of the individual orders for each stock are irrelevant, provided that the total weighted average of these individual prices is equal to the specified price for the entire basket.

2) Arbitrage Strategies. An arbitrage strategy is defined as a set of strategy items in two or more markets having a mix of sides, and whose payments are all capable of being netted. Thus, for every buy payment of a given asset on a given date defined in a given item's market, there is at least one offsetting sell payment of the same asset on the same date that can be found defined in a different market contained in another of the strategy's items. The creator of an arbitrage strategy can also specify a required return on investment (ROI) for the strategy. An example of an arbitrage strategy is illustrated later in this document.

3) Hedge Strategies. A hedge strategy is similar to an arbitrage strategy, but differs in that it does not have any payment netting requirements, nor is there any explicit profit relationship involved. An example of a hedge strategy is a strategy containing two items, one of which specifies the purchase of a 30 year U.S. government treasury bond and the other which specifies the sale of a futures contract linked to U.S. government treasury bonds. Unlike those of arbitrage strategies, which are implied, the price and amount formulae for each of the strategy items in a hedge strategy must be explicitly defined by the creator of the strategy. Some commonly used types of hedge strategies are spreads, straddles and strangles.

The execution of a strategy represents a complex transaction that relies upon information obtained from several markets, orders and other business objects. Guaranteeing all-or-nothing execution of a strategy means ensuring that none of this information is changed by another transaction while the execution of the strategy is taking place. To achieve this end, the invention employs a transaction management technique called optimistic locking. In an optimistic locking environment, each business object contains a version number and each transaction gets its own copy of every business object that it reads. Any changes made during the course of a transaction are made to the transaction's copy of the business object, not to the original business object itself. When a transaction is completed, the transaction checks the version number on each of its business object copies with the version number on the corresponding original. If the version numbers are the same, the transaction updates the original business object with the changes made to the copy and also increments the version number of the original business object by one. If the version numbers are different, however, it means that one or more additional transactions have modified the original business object since the first transaction obtained its copy of that object. In this case, the first transaction discards its business object copies and repeats the process with new copies until it is able to complete without encountering a version number conflict.

Figure 3:
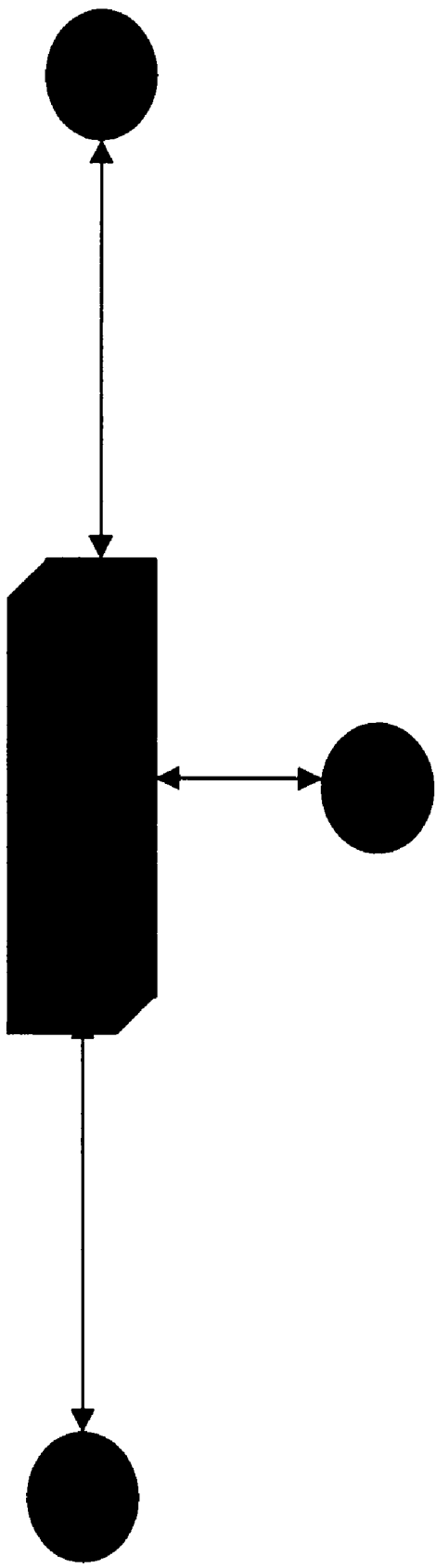
FIG. 3 illustrates a computer network in which the inventive system is incorporated as an independent host site.
Figure 4:
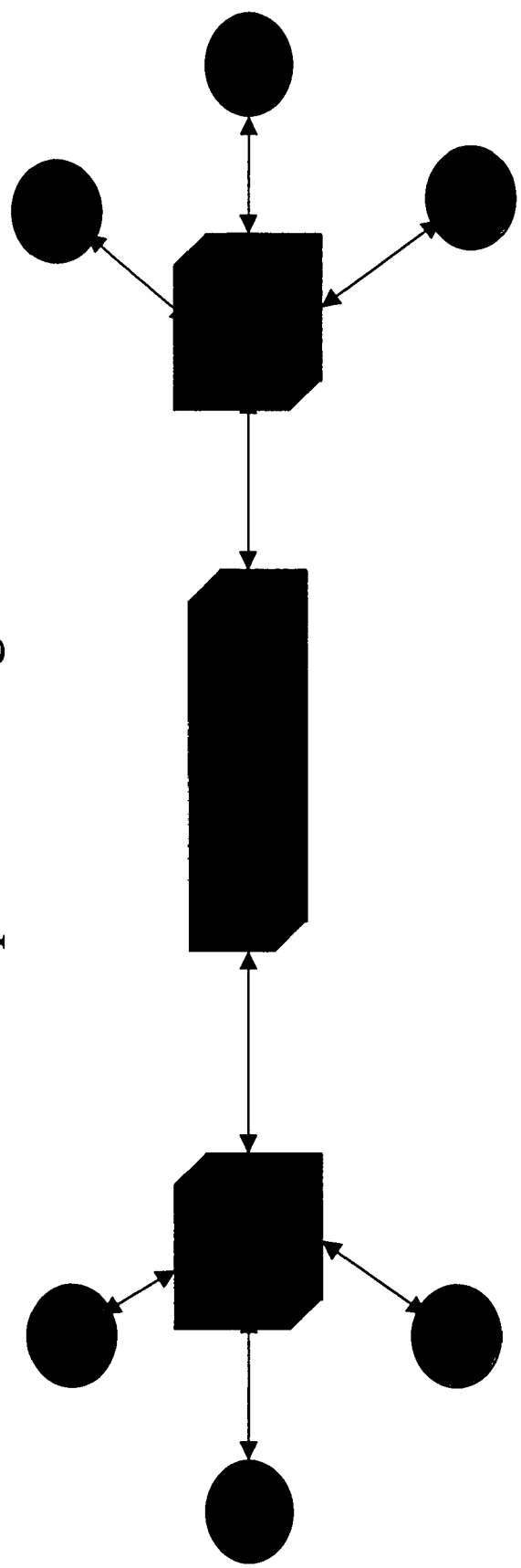
FIG. 4 illustrates a computer network in which the inventive system is incorporated as an enterprise trading network comprised of several linked host sites that belong to the same corporate entity.
Figure 5:
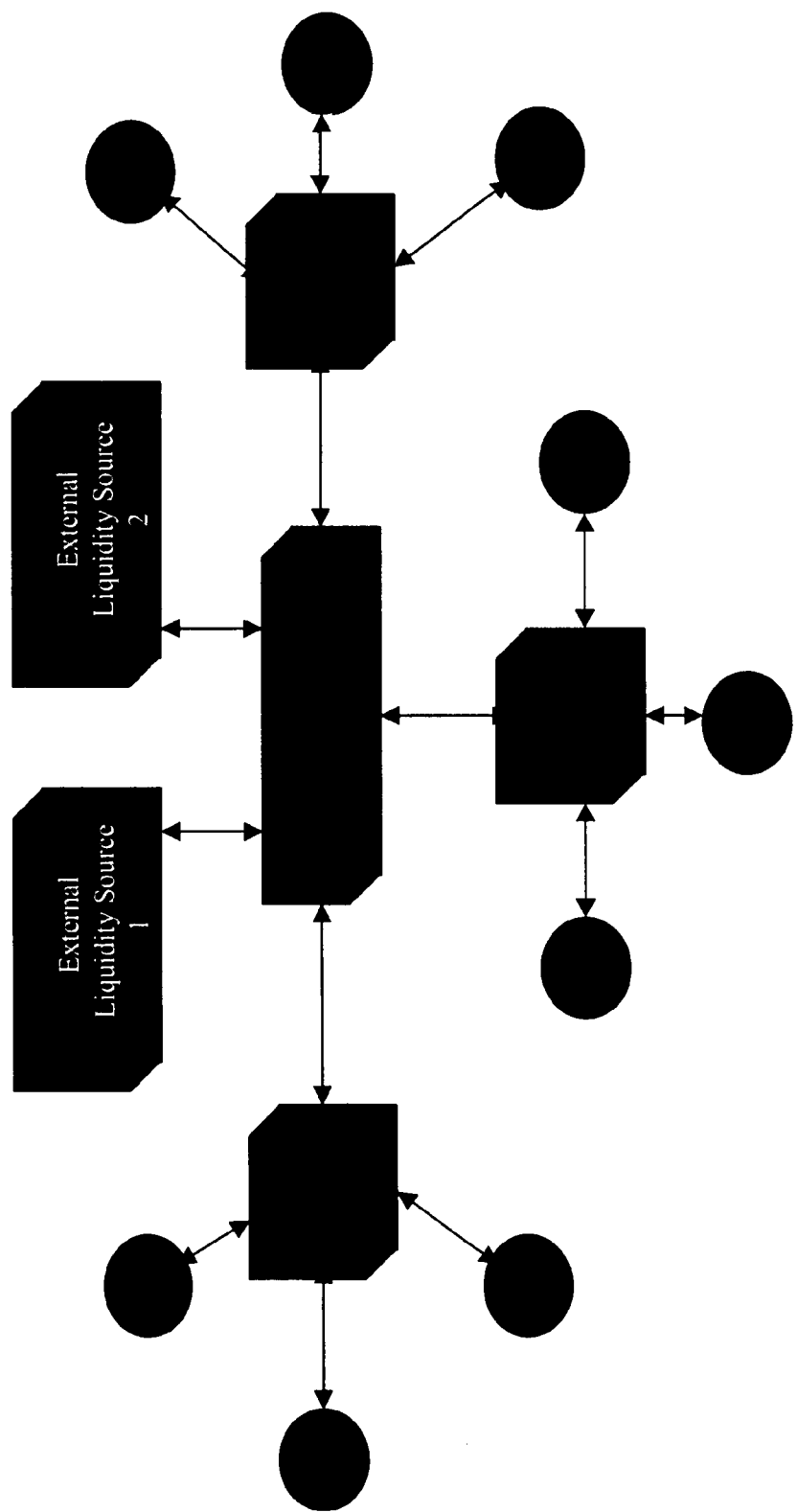
FIG. 5 illustrates a computer network in which the inventive system is incorporated as a global trading network comprised of several linked host sites, some of which belong to different corporate entities.

FIGS. 3, 4 and 5 illustrate high-level views of three embodiments of the inventive online electronic system for trading assets. The figures illustrate three different deployment scenarios involving three fictitious entities: ABC Bank, which has branches in New York and London, XYZ Bank, which has a single branch in Tokyo, and HostCo, a global hosting services company which has a single office in Chicago.

FIG. 3 illustrates a high-level view of System 300 operated in the form of an individual Host Site 302 by ABC Bank's New York branch. System 300 is incorporated in a LAN 100, and includes multiple client systems 304 connected to the Host Site 302. All other components of the system are contained within the Host Site 302, and these components will be examined in more detail in subsequent figures.

FIG. 4 illustrates a high-level view of System 400, an implementation of the invention as an enterprise-wide trading exchange distributed across the New York and London branches of ABC Bank. System 400 consists of an enterprise coordinator site 402, which links together two individual host sites 404. Each host site 404 is located at a branch of ABC Bank, and the enterprise coordinator site 402 is located at the New York branch of the bank. Each host site 404 can be incorporated in a LAN, as shown in FIG. 1 at 100, which is connected by a router to the Internet or other wide area network.

FIG. 5 illustrates a high-level view of System 500, an implementation of the invention as a global trading exchange distributed across the New York and London branches of ABC Bank, the Tokyo branch of XYZ Bank and the HostCo Chicago office. System 500 consists of a global coordinator site 502, which links together three individual host sites 504. Two host sites 504 are located at the New York and London branches of ABC Bank, and one is located at the Tokyo branch of XYZ Bank. The global coordinator site 502 is located at HostCo's office in Chicago.

Figure 6:
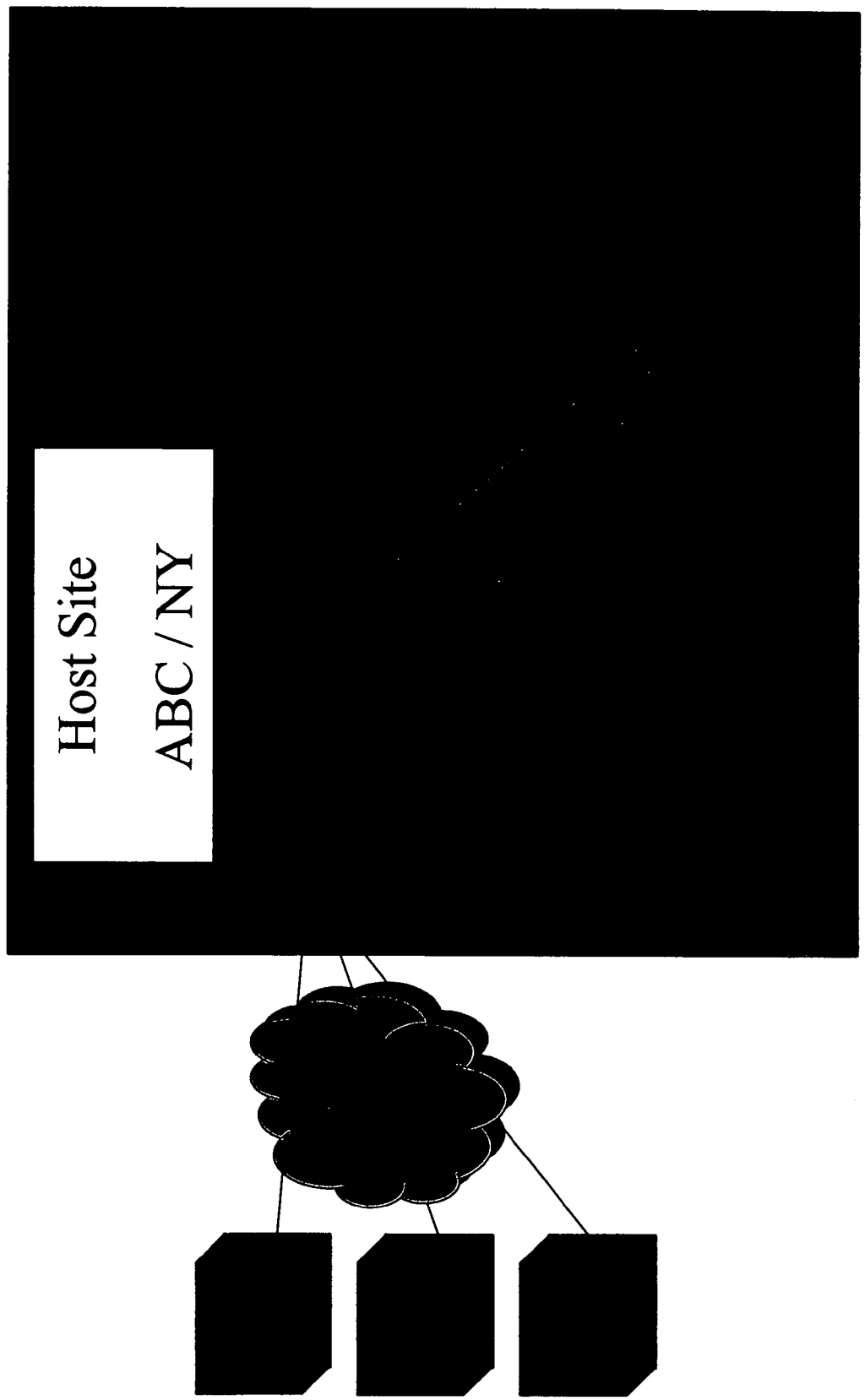
FIG. 6 illustrates the starting point for a demonstrative trading scenario of clients connected to a host site containing an order router, three markets and a trading strategy.

FIG. 6 illustrates a more detailed view of the single host site implementation of the invention illustrated in FIG. 3. System 600 includes multiple client systems 602, multiple order routers 604, multiple market servers 606 (each operating on behalf of a specific market), and multiple strategy servers 608. System 600 enables users to define new virtual electronic markets, to simultaneously operate multiple market servers 606, each of which processes orders on behalf of a specific virtual market, to simultaneously monitor large numbers of virtual markets from client systems 602, to transmit buy and sell orders from client systems 602 to virtual markets via order routers 604, and to define cross-market trading strategies and transmit them to strategy servers 608 which will continuously attempt to execute orders in each of the markets contained within a given strategy simultaneously, subject to the order price and amount relationship constraints defined within that strategy.

System 600 includes notification mechanisms between market servers 606 and strategy servers 608, which enable them to coordinate the matching and execution of orders in way that guarantees the atomic, all-or-nothing execution of the orders that make up a given trading strategy. Each market server 606 includes its own order matching engine for matching buy and sell orders in that market. System 600 thus includes a collection of simultaneously active markets. Examples of markets include a spot (settlement of payments to take place on the second valid business day following the trade date) foreign exchange market for trading Euros (EUR) in exchange for U.S. dollars (USD), a spot foreign exchange market for trading USD in exchange for Japanese Yen (JPY), and a spot foreign exchange market for trading EUR in exchange for JPY. Client systems 602 are used by system 600 to publish information to users of system 600. When the user logs onto client system 602, the user is able to see messages published on that system. Client system 602 may be downloaded into a web browser from a web page on the Internet each time the user wishes to use the client system 602, or client system 602 may be permanently installed on the user's computer as a program file.

In a preferred embodiment of the invention, prior to entering orders in system 600, a system administrator of system 600 must have registered the user with system 600 and established one or more accounts on the user's behalf, which may require the user to enter a deposit of currency and/or other assets into his/her account(s). Each order entered by the user from a client system 602 is transmitted to an order router 604 and the order router 604 checks the size of the order against the remaining balance in the user's account to ensure that the user is authorized to enter the order. Router 604 also determines which market the order is for and transmits it to the appropriate market server 606 for processing.

When a new, incoming order is processed by a market server 606, the market server 606 will first determine the side (buy or sell) of the new order and then begin iterating one-by-one through the list of active counterorders (orders with an opposite side) that the market server maintains. In each iteration, an attempt is made to match the price of the new order against that of the counterorder in the current iteration. The list of counterorders will be sorted by price, with the counterorders having the highest buy prices (if the counterorders are buy orders) or the lowest sell prices (if the counterorders are sell orders) appearing first. If a price match is found to exist between the new order and the current counterorder, the market server will attempt an amount match by examining the available amount (the original order amount less the sum of any previous partial executions against the order) of each order and any minimum trade amount specified for each order, to determine the maximum possible amount for a trade. If the two orders originated from different host sites, the market server will also invoke the credit checking mechanism to determine the largest credit amount that would be mutually permitted by the respective credit lines. The lesser of this credit amount and the previously calculated trade amount will become the final trade amount. If the final trade amount is greater than zero, the amount match succeeds and a trade in that amount will be generated between the two orders. If the attempted amount match fails, the market server will iterate to the next counterorder in the list of counterorders and begin a new matching procedure. This iteration through the counterorders in the list of counterorders will continue until one of the following events occurs:

1) The new order has been exhausted, i.e. the new order has been completely filled, or the remaining available amount of the new order is less than the minimum trade amount specified for the new order.

2) The attempted price match between the new order and the current counterorder fails, and the new order has a lifespan of Fill-Or-Kill.

3) The market server reaches the end of the list of counterorders and the new order has a lifespan of Fill-Or-Kill.

4) The attempted price match between the new order and the current counterorder fails, and the new order has an active (not Fill-Or-Kill) lifespan.

5) The market server reaches the end of the list of counterorders and the new order has an active lifespan.

If the matching process stops due to the occurrence of events 1, 2 or 3, the market server will tag the new order as inactive and begin processing the next new incoming order. If the order matching process stops due to events 4 or 5, however, the market server will then add the new order to the appropriate list of buy or sell counterorders before it begins processing the next new incoming order. If, in the process of matching the new order against the current counterorder, the market server generates a trade between the new order and the current counterorder, and if the amount of the newly generated trade causes the current counterorder to become exhausted, the market server will also tag the current counterorder as inactive and remove the current counterorder from the list of counterorders.

FIG. 7 illustrates detailed information about three currency markets (also referred to as Foreign Exchange or FX markets) defined using the invention. Market A is a market for trading Euros (EUR) in exchange for U.S. dollars (USD). The definition of Market A specifies two payments. Payment 1 is a Buy payment having an asset of EUR and a payment factor of 1. Payment 2 is a Sell payment having an asset of USD and a payment factor equal to the trade price. This means that for any trades executed within Market A, the buy account (the account which placed the buy order) will receive the EUR buy payment from the sell account, and the sell account will receive the USD sell payment from the buy account. Both payments have a payment date of T+2, which means that they will take place on the second valid business day following the trade date. The amount of each payment will be equal to the trade amount multiplied by the respective payment factor. For example, if a buy order for Market A having a size of 1,000,000 and a price of 1.0245 were matched on Aug. 28, 2000 against a sell order for Market A having the same size and price, then the buy account would receive a payment of 1,000,000 EUR on Aug. 30, 2000 from the sell account, and make a payment of 1,024,500 USD on the same date to the sell account.

The other two markets shown in FIG. 7 have the same characteristics as Market A, with the exception that Market B is a market for trading USD in exchange for Japanese Yen (JPY), and Market C is a market for trading EUR in exchange for JPY.

FIG. 8 illustrates detailed information about six orders created using the invention: Order 1, placed by account 101, is a buy order for Market A (EUR/USD Spot FX) having a size of one million and a price of 1.0235; Order 2, placed by account 102, is a sell order for Market A having a size of one million and a price of 1.0245; Order 3, placed by account 103, is a buy order for Market B (USD/JPY Spot FX) having a size of three million and a price of 103.15; Order 4, placed by account 104, is a sell order for Market B having a size of seven million and a price of 103.25; Order 5, placed by account 105, is a buy order for Market C (EUR/JPY Spot FX) having a size of one million and a price of 105.55; Order 6, placed by account 106, is a sell order for Market C having a size of two million and a price of 105.65.

Figure 9:
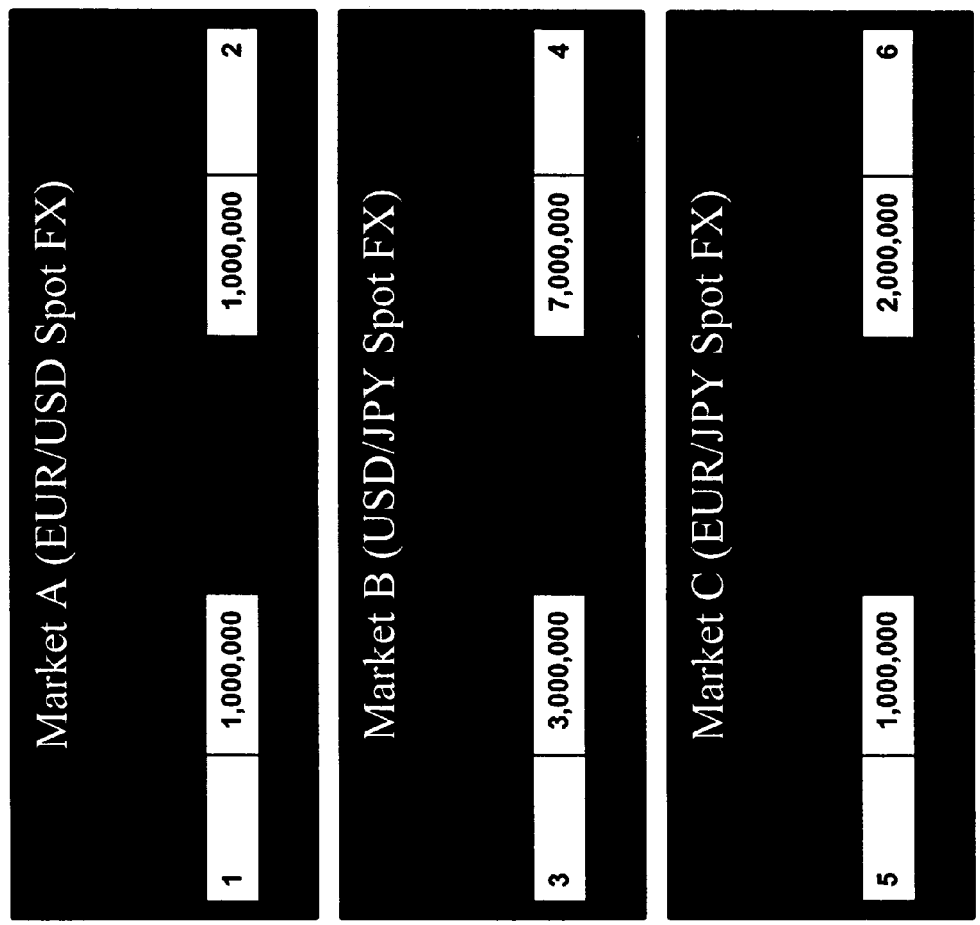
FIG. 9 illustrates the state of the markets referenced in the demo scenario after the initial orders pictured in FIG. 8 have been processed by their respective markets.

FIG. 9 illustrates the state of Markets A, B, and C after orders one through six have been processed.

FIG. 10 illustrates detailed information about a trading strategy defined using the invention as part of the previously described demo scenario. The strategy (called "FX Arbitrage Strategy") is defined as an arbitrage strategy that has a required Return On Investment (ROI) of "1/10%", a Profit Location (the asset/date "bucket" where the resulting ROI ends up) of "USD Spot", and is comprised of three Strategy Items: Item #1 is a sell item linked to Market A (EUR/USD Spot FX), Item #2 is a sell item linked to Market B (USD/JPY Spot FX), and Item #3 is a buy item linked to Market C (EUR/JPY Spot FX).

When activated, a strategy must first identify the best existing counterorder for each of its Items. For Item #1, the best counterorder would be order #1, a buy order in Market A having a price of 1.0235 and a size of 1,000,000. For Item #2, the best counterorder would be order #3, a buy order in Market B having a price of 103.15 and a size of 3,000,000. For Item #3, the best counterorder would be order #6, a sell order in Market C having a price of 105.50 and a size of 2,000,000. The details of these three counterorders are pictured in FIG. 8, and their positions within their respective markets are illustrated in FIG. 9.

Once the strategy has identified the counterorder for each of its Items, it can then calculate the price and amount for the order it will place on behalf of each Item. Item #1 is defined as having a price formula of (C.BestPrice/B.BestPrice)× 1.001. This means that to calculate the price for the order which will be placed on behalf of Item #1, the strategy must take the best sell price (the price of the best counterorder) from Market C, divide it by the best buy price from Market B, and then multiply the result by 1.001 to build in the required Return On Investment of 1/10%. (If the Item were a buy Item, the price would be divided by 1.001 to build in the required ROI). The calculated price would therefore be equal to 1.02380514 as seen below:

105.5/103.15=1.02278236

1.02278236×1.001=1.02380514

Since this Item is a sell Item and the strategy will therefore be placing a sell order on its behalf, the order price must be rounded up to the number of decimal places which are conventionally used when placing orders in the EUR/USD Spot FX Market (four places to the right of the decimal), making the final order price 1.0239. Conversely, for buy Items, the price would be rounded down. This process will be repeated by the strategy for each of its other two Items, resulting in the calculated prices illustrated in FIG. 10. Thus, Item #2 is defined as having a price formula of (C.BestPrice/A.BestPrice)×1.001, which is equal to 103.180752. Item #3, which is a buy item, and thus is defined as having a price formula of (A.BestPrice×B.BestPrice)/1.001, or (1.0235×103.15)/1.001=105.468556.

The strategy must also calculate the order sizes for each of its Items. FIGS. 11-13 illustrate the process that the strategy goes through to do this.

FIG. 11 illustrates the relationships between the payment amounts that would result from the execution of the FX Arbitrage Strategy. Each payment amount is identified by the unique combination of market and payment number that generated it. For example, the payment amount identified as "A1" represents the payment amount that would result from payment #1 in Market A. These market payments and their associated payment factors were illustrated in FIG. 7. The sequence of steps that the strategy takes to calculate the proposed order amount for Item #1 is as follows:

1) Generate the set of unique asset/date "buckets" from all the market payments that are contained within the strategy. For the FX Arbitrage Strategy described in the demo scenario, this set consists of EUR Spot, USD Spot and JPY Spot as illustrated in FIG. 11.

2) Identify the market payments contained within each bucket. For example, the "EUR Spot" bucket contains the market payments "C1" and "A1" and the "JPY Spot" bucket contains the market payments "B2" and "C2".

3) Identify the starting market. The market linked to the Item for which the strategy is calculating the proposed order amount cannot be the starting market. In this scenario, the strategy is calculating the order amount for item #1, which is linked to Market A, so the starting market must be either Market B or C. The starting market must also have at least one payment that is not contained in the bucket specified as the strategy's Profit Location. (The Profit Location is the payment bucket in an arbitrage strategy that the strategy's creator designates as the desired location for profits resulting from execution of the strategy. By definition, all other buckets within the strategy will have payment amounts which net to zero. In the demo scenario the profit location is USD Spot). The first bucket in the set (EUR Spot) contains a market payment C1 that meets these criteria, so Market C will be the starting market.

4) Calculate the amounts for all of the payments for the starting market. The best counterorder for Market C was previously determined to be order #6, which has an available amount of 2,000,000. The amount for each payment of the starting market C will be equal to the available counterorder amount of 2,000,000 multiplied by the respective payment factor. This will result in amounts of 2,000,000 (2,000,000×1) for payment C1, and 211,000,000 (2,000,000×105.50) for payment C2, respectively.

5) Calculate the implied amounts for payments from other markets which offset the payments for the starting market calculated in step 4. Since the amount for payment C1 was determined in step 4 to be 2,000,000, the amount for payment A1 must also be 2,000,000, because both payments are contained within the same bucket (EUR Spot, which is not the desired location for profits resulting from execution of the strategy.) and must therefore exactly offset each other. Likewise, the amount of 211,000,000 calculated for payment C2 can be used to imply the amount for payment B2, which shares its bucket.

6) Iteratively calculate the amounts of any remaining unknown payments for each of the strategy's markets and use them to imply the required order amount for the respective market. This is done by dividing the amount of one of the market's known payments by its payment factor to determine the required order amount for that market and then multiplying this order amount by the payment factor for the unknown payment to determine its amount. Thus, to calculate the amount for the unknown payment A2, the amount of the known payment A1 from market A (determined to be 2,000,000 in step 5) will be divided by the payment factor for A1 (which, as illustrated in FIG. 7, is equal to 1), resulting in a required order amount for market A of 2,000,000. This order amount will then be multiplied by the payment factor from the unknown payment A2 (which, as illustrated in FIG. 7 is equal to the price for market A which, in turn, was previously calculated in the description of FIG. 10 to be 1.0239), resulting in an amount for payment A2 of 2,047,800. Similarly, the amount of the remaining unknown payment, B1, will be derived by dividing the amount of known payment B2 (determined to be 211,000,000 in step 5) by its payment factor of 103.15 (the price from the counterorder for market B as illustrated in FIG. 10), resulting in a required order amount for market B of 2,045,564.712, which in turn will be multiplied by the payment factor for B1 (which, as illustrated in FIG. 7, is equal to 1), resulting in an amount for payment B1 of 2045,564.712.

7) For each iteration in step 6, if the market for the current iteration is not the market linked to the Item for which the strategy is calculating the proposed order amount (Market A linked to Item #1 in this case), then compare the required order size for the given market with the available amount from that market's counterorder. If the required order size exceeds the available amount from the counterorder then the amounts for all of the market payments within the strategy must be multiplied by the ratio of the available counterorder amount to the required order size. For example, if the required order size for a given market was calculated to be 2,000,000, but the available amount from that market's counterorder was only 1,000,000, then the amounts for all of the market payments within the strategy would be multiplied by 0.5. This process is performed iteratively until all the required order sizes have been validated against the available amounts of their respective counterorders, thus guaranteeing that if any order generated by the strategy is subsequently matched against a new incoming order, the strategy will be able to execute trades in each of the strategy's other markets in amounts sufficient to fulfill the strategy's ROI requirement.

FIG. 12 and FIG. 13 illustrate the performance of Steps 1-7 above for markets B and C, respectively. The processes illustrated in FIGS. 10-13 will be repeated to calculate new prices and sizes for the strategy's orders whenever any of the following events occurs:

1) A counterorder linked to any of the strategy's items is cancelled.
2) A counterorder linked to any of the strategy's items is partially or completely depleted as a result of being matched against a new incoming order for its respective market.
3) A new incoming order is placed in any of the strategy's markets where the side of the new order is the same as that of the strategy's existing counterorder for that market, and the price of the new order is better than the price of the existing counterorder.

FIG. 14 illustrates detailed information about the three orders generated automatically by the FX Arbitrage Strategy using price and size information calculated in the processes illustrated in FIGS. 10-13. As shown in FIGS. 10 and 11, the calculated sell price for a Market A was 1.0239 for an amount of 2,000,000. As shown in FIGS. 10 and 12, the calculated sell price for Market B was 103.19 for an amount of 1,022,386. As shown in FIGS. 10 and 13, the calculated buy price form Market C was 105.46 for an amount of 1,000,000. Thus, the strategy generated the lowest sell prices and the highest buy prices for the respective markets.

FIG. 15 illustrates the state of Markets A, B and C after the three orders generated automatically by the FX Arbitrage Strategy have been placed in their respective markets. Order #7 replaces Order #2 as the best existing sell order in Market A, Order #8 replaces Order #4 as the best sell order in Market B, and Order #9 replaces Order #5 as the best buy order in Market C.

FIG. 16 illustrates the details of a new incoming order Shown as Order # 10, which is in Market A, which will trigger the execution of the FX Arbitrage Strategy.

FIG. 17 illustrates the sequence of trades that are generated by the placement of the new incoming Order #10. The new Order #10 is a buy order for Market A at a price of 1.0239 which will match against existing sell Order #7 at the same price, generating Trade #1 in the amount of 2,000,000. Since Order #7 is linked to the FX Arbitrage Strategy, the execution of a trade against Order #7 will cause the strategy to begin executing its other orders in markets B and C by changing the price of each order to match that of the counterorder for the respective market, and by changing the amount of each order to match the amount required for each market as illustrated in FIG. 11. The strategy will therefore change the amount and price of Order #8 from 1,022,386 at a price of 103.19, to 2,045,564 at a price of 103.15 and match Order #8 against Order #3 to generate Trade #2. Finally, the strategy will change the amount and price of Order #9 from 1,000,000 at a price of 105.46 to 2,000,000 at a price of 105.50 and match Order #9 against Order #6 to generate Trade #3.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for online trading assets via transactionally linked virtual markets comprising the steps of:
   defining attributes and behaviors of virtual markets;
   placing individual buy and sell orders in the virtual markets;
   defining at least one unified cross-market trading strategy that includes at least a first order in a first virtual market and a second order in a second virtual market;
   automatically calculating, based on the unified cross-market trading strategy, a price and an amount for the first order in the first virtual market based on a price and an amount of one or more orders in the second virtual market;
   automatically calculating, based on the unified cross-market trading strategy, a price and an amount for the second order in the second virtual market based on a price and an amount of one or more orders in the first virtual market;
   automatically routing the first and second orders to their respective virtual markets; and
   automatically matching and executing both individual orders and orders generated by cross-market trading strategies for virtual markets;
   wherein at least part of the method is performed on one or more computer systems.

2. The method of claim 1, wherein the attributes and behaviors of the virtual markets include asset types, payment dates, and payment factors.

3. The method of claim 1, wherein the attributes and behaviors of the virtual markets replicate those of conventional markets.

4. The method of claim 1, wherein the step of placing an individual buy and sell order includes specifying a total size of the order, a minimum allowable size of a partial execution of the order, a portion of the total size of the order that will be visible to others, and an indication of which of the virtual markets the order is for, and the price of the order.

5. The method of claim 1, wherein the step of defining at least one unified cross-market trading strategy further comprises the step of specifying a type of trading strategy.

6. The method of claim 5, wherein the type of cross-market trading strategy is selected from the group consisting of: arbitrage, basket, and hedge.

7. The method of claim 1, wherein the step of defining at least one unified cross-market trading strategy further comprises the step of specifying the virtual markets referenced by the cross-market trading strategy.

8. The method of claim 1, wherein the step of defining at least one unified cross-market trading strategy further comprises the step of defining formulae to calculate prices and amounts for each virtual market referenced by the cross-market trading strategy based upon counterorders from other virtual markets.

9. The method of claim 8, wherein the step of defining formulae to calculate further comprises the step of identifying a best counterorder for each initial buy or sell order.

10. The method of claim 1, wherein the step of defining at least one unified cross-market trading strategy further comprises the step of automatically generating new orders on behalf of the defined cross-market trading strategy.

11. The method of claim 1, wherein the step of matching and executing both individual orders and orders generated by cross-market trading strategies comprises the step of automatically and continuously modifying orders as needed on behalf of defined cross-market trading strategies in response to changes in the virtual markets referenced by the cross-market trading strategies.

12. A system for online trading of assets via transactionally linked virtual markets comprising a market creation mechanism to enable users to create a plurality of virtual markets;

a plurality of active market servers to support the operation of each of the created virtual markets;

an order creation mechanism to allow users to create, buy, or sell orders related to the virtual markets;

a strategy creation mechanism to enable users to define cross-market trading strategies and specify the virtual markets referenced by the cross-market trading strategies, wherein the cross-market trading strategies comprise at least one unified cross-market trading strategy that includes at least a first order in a first virtual market and a second order in a second virtual market;

a plurality of active strategy servers to generate new orders on behalf of the specified cross-market trading strategies and to dynamically coordinate with the plurality of active market servers to continuously monitor relationships between virtual markets and modify orders generated on behalf of cross-market trading strategies; wherein at least one of the servers automatically calculates, based on the unified cross-market trading strategy, a price and an amount for the first order in the first virtual market based on a price and an amount of one or more orders in the second virtual market; and at least one of the servers automatically calculates, based on the unified cross-market trading strategy, a price and an amount for the second order in the second virtual market based on a price and an amount of one or more orders in the first virtual market; and a linking mechanism to enable orders and counterorders from different servers to be linked.

13. The system of claim 12, comprising:

an adapter that enables external systems to link into the system so that users in the system may select from and share orders with external liquidity sources;

an order validation mechanism; and a credit limit validation mechanism.

14. The system of claim 13, wherein the order validation mechanism allows a host site to establish trading limits for the host site's accounts.

15. The system of claim 14, wherein the order validation mechanism validates each created new order against the trading limits, and once validated, sends the new order to at least one of the plurality of virtual markets.

16. The system of claim 13, wherein the credit limit validation mechanism allows host sites to establish mutual lines of credit for specified markets and use these lines of credit to act as guarantors when matching orders that originate from different host sites.

17. The system of claim 13, further comprising a plurality of access control servers to authenticate each user.

18. The system of claim 17, wherein the plurality of access control servers determine an authorized level of system access granted to each user before allowing each user to access the system.

19. A system for online trading of assets via transactionally linked virtual markets comprising:

a plurality of client systems for entering orders by a client;

a plurality of order routers for determining which market for an existing plurality of markets the order is in and transmitting the order to a market server;

a plurality of market servers for matching the order with existing counterorders and monitoring the plurality of markets; and a plurality of strategy servers for generating new orders, and routing the generated orders to each market defined in a trading strategy and coordinating with the plurality of market servers to insure atomic execution of all orders that make up the trading strategy; wherein at least one of the servers automatically calculates, based on a unified cross-market trading strategy, a price and an amount for a first order in a first virtual market based on a price and an amount of one or more orders in a second virtual market; and at least one of the servers automatically calculates, based on the unified cross-market trading strategy, a price and an amount for a second order in the second virtual market based on a price and an amount of one or more orders in the first virtual market.

* * * * *

UNITED STATES PATENT AND TRADEMARK OFFICE
CERTIFICATE OF CORRECTION

PATENT NO.      : 7,330,834 B1  
APPLICATION NO. : 09/679813  
DATED           : February 12, 2008  
INVENTOR(S)     : Steven A. LaPierre Page 1 of 18

It is certified that error appears in the above-identified patent and that said Letters Patent is hereby corrected as shown below:

Title page, illustrative fig. 10 should be deleted and substitute therefore the attached title page consisting of illustrative fig. 10 as shown on the attached Title Page.

In the Drawings

Fig(s) 2-17 should be deleted and substitute therefore the attached figure(s) 2-17 as shown on the attached pages 3-18.

Signed and Sealed this  
Twenty-sixth Day of August, 2014

Michelle K. Lee  
*Deputy Director of the United States Patent and Trademark Office*

(12) United States Patent
LaPierre

(10) Patent No.: US 7,330,834 B1
(45) Date of Patent: Feb. 12, 2008

(54) SYSTEM AND METHOD FOR ELECTRONIC TRADING OF ASSETS

(75) Inventor: Steven A. LaPierre, Washington Crossing, PA (US)

(73) Assignee: Novaplex Technologies, Inc., Langhorne, PA (US)

( * ) Notice: Subject to any disclaimer, the term of this patent is extended or adjusted under 35 U.S.C. 154(b) by 702 days.

(21) Appl. No.: 09/679,813

(22) Filed: Oct. 5, 2000

(51) Int. Cl.
*G06Q 40/00* (2006.01)

(52) U.S. Cl. .......................... 705/37; 705/35
(58) Field of Classification Search ............... 705/37, 705/32, 26, 28
See application file for complete search history.

(56) References Cited

U.S. PATENT DOCUMENTS

| | | | | |
|---|---|---|---|---|
| 5,375,055 A * | 12/1994 | Togher et al. | ............... | 705/37 |
| 5,689,652 A * | 11/1997 | Lupien et al. | ............... | 705/37 |
| 5,732,400 A * | 3/1998 | Mandler et al. | ............... | 705/26 |
| 5,809,144 A * | 9/1998 | Sirbu et al. | ............... | 705/53 |
| 5,845,265 A * | 12/1998 | Woolston | ............... | 705/37 |
| 5,845,266 A * | 12/1998 | Lupien et al. | ............... | 705/37 |
| 5,862,223 A * | 1/1999 | Walker et al. | ............... | 705/50 |
| 5,893,076 A * | 4/1999 | Hafner et al. | ............... | 705/28 |
| 5,895,454 A * | 4/1999 | Harrington | ............... | 705/26 |
| 5,905,975 A * | 5/1999 | Ausubel | ............... | 705/37 |
| 5,918,218 A * | 6/1999 | Harris et al. | ............... | 705/37 |
| 5,950,176 A * | 9/1999 | Keiser et al. | ............... | 705/37 |
| 5,950,177 A * | 9/1999 | Lupien et al. | ............... | 705/37 |
| 5,963,915 A * | 10/1999 | Kirsch | ............... | 705/26 |
| 5,963,923 A * | 10/1999 | Garber | ............... | 705/37 |
| 5,974,395 A * | 10/1999 | Bellini et al. | ............... | 705/9 |
| 6,014,627 A * | 1/2000 | Togher et al. | ............... | 705/1 |
| 6,195,646 B1 * | 2/2001 | Grosh et al. | ............... | 705/26 |
| 6,401,211 B1 * | 6/2002 | Brezak et al. | ............... | 713/201 |
| 6,505,174 B1 * | 1/2003 | Keiser et al. | ............... | 705/37 |
| 6,584,502 B1 * | 6/2003 | Natarajan et al. | ............... | 709/224 |
| 6,662,221 B1 * | 12/2003 | Gonda et al. | ............... | 709/223 |
| 2001/0032163 A1 * | 10/2001 | Fertik et al. | ............... | 705/37 |
| 2002/0032579 A1 * | 3/2002 | Harpale | ............... | 705/1 |
| 2002/0128952 A1 * | 9/2002 | Melkomian et al. | ............... | 705/37 |
| 2002/0133449 A1 * | 9/2002 | Segal et al. | ............... | 705/37 |
| 2003/0037072 A1 * | 2/2003 | Bowman et al. | ............... | 707/201 |
| 2003/0115132 A1 * | 6/2003 | Iggland | ............... | 705/37 |
| 2003/0126068 A1 * | 7/2003 | Hauk et al. | ............... | 705/37 |

FOREIGN PATENT DOCUMENTS

| | | | |
|---|---|---|---|
| WO | WO 01/14994 A2 * | 3/2001 | |
| WO | WO 01/25995 A1 * | 4/2001 | |
| WO | WO 01/37509 A2 * | 5/2001 | |
| WO | WO 01/75731 A1 * | 10/2001 | |

OTHER PUBLICATIONS

Mavrides, M. J: The Efficiency of Triangular Arbitrage in the Foreign Exchange Market: 1991 University of Illinois at Chicago (0799); vol. 5206A.*

* cited by examiner

*Primary Examiner*—Hani M. Kazimi
*Assistant Examiner*—Olabode Akintola
(74) *Attorney, Agent, or Firm*—Morgan Lewis & Bockius LLP

(57) ABSTRACT

A method for online trading of assets via transactionally linked virtual markets comprising the steps of defining attributes and behaviors of each of the virtual markets; placing individual buy or sell orders in each of the virtual markets; optionally defining trading strategies that will each span at least two virtual markets; calculating a price and amount for each order in the virtual markets defined by a trading strategy; generating an order in each of the virtual markets contained within a trading strategy; and matching and executing both the individual orders and orders generated by the defined trading strategies.

19 Claims, 17 Drawing Sheets

FX Arbitrage Strategy

Required ROI: 1/10% (44% annualized)
Profit Location: USD Spot

| Item | Market | Side | Best Price | Available Amount | Price Forumla | Calculated Price | Calculated Price |
|---|---|---|---|---|---|---|---|
| 1 | A) EUR/USD | Sell | 1.0235 | 1,000,000 | (C.BestPrice / B.BestPrice) x 1.001 | 1.02380514 | 2,000,000 |
| | | | | | | | |
| 2 | B) USD/JPY | Sell | 103.15 | 3,000,000 | (C.BestPrice / A.BestPrice) x 1.001 | 103.180752 | 1,022,386 |
| | | | | | | | |
| 3 | C) EUR/JPY | Buy | 105.50 | 2,000,000 | (A.BestPrice x B.BestPrice) / 1.001 | 105.468556 | 1,000,000 |

TCP/IP Layering Model

System 300

Independent Host Site

System 400
Enterprise Trading Network

Global Trading Network

Figure 7

Market Definitions

| Market | Payment # | Payment Side | Payment Asset | Payment Date | Payment Factor |
|---|---|---|---|---|---|
| A) EUR/USD Spot FX | 1 | BUY | EUR | Spot Date (T+2) | 1 |
| | 2 | SELL | USD | Spot Date (T+2) | Trade price |
| | | | | | |
| B) USD/JPY Spot FX | 1 | BUY | USD | Spot Date (T+2) | 1 |
| | 2 | SELL | JPY | Spot Date (T+2) | Trade price |
| | | | | | |
| C) EUR/JPY Spot FX | 1 | BUY | EUR | Spot Date (T+2) | 1 |
| | 2 | SELL | JPY | Spot Date (T+2) | Trade price |

Figure 8

Initial Orders

| Market | Order # | Account # | Side | Amount | Price |
|---|---|---|---|---|---|
| A) EUR/USD Spot FX | 1 | 101 | BUY | 1,000,000 | 1.0235 |
|  | 2 | 102 | SELL | 1,000,000 | 1.0245 |
|  |  |  |  |  |  |
| B) USD/JPY Spot FX | 3 | 103 | BUY | 3,000,000 | 103.15 |
|  | 4 | 104 | SELL | 7,000,000 | 103.25 |
|  |  |  |  |  |  |
| C) EUR/JPY Spot FX | 5 | 105 | BUY | 1,000,000 | 105.40 |
|  | 6 | 106 | SELL | 2,000,000 | 105.50 |

Figure 9

State Of Markets Following Placement Of Initial Orders

| Market A (EUR/USD Spot FX) |||||||
|---|---|---|---|---|---|
| Buy Orders ||| Sell Orders |||
| Order # | Amount | Price | Price | Amount | Order # |
| 1 | 1,000,000 | 1.0235 | 1.0245 | 1,000,000 | 2 |

| Market B (USD/JPY Spot FX) |||||||
|---|---|---|---|---|---|
| Buy Orders ||| Sell Orders |||
| Order # | Amount | Price | Price | Amount | Order # |
| 3 | 3,000,000 | 103.15 | 103.25 | 7,000,000 | 4 |

| Market C (EUR/JPY Spot FX) |||||||
|---|---|---|---|---|---|
| Buy Orders ||| Sell Orders |||
| Order # | Amount | Price | Price | Amount | Order # |
| 5 | 1,000,000 | 105.40 | 105.50 | 2,000,000 | 6 |

Figure 10

FX Arbitrage Strategy

Required ROI: 1/10% (44% annualized)
Profit Location: USD Spot

| Item | Market | Side | Best Price | Available Amount | Price Forumla | Calculated Price | Calculated Price |
|---|---|---|---|---|---|---|---|
| 1 | A) EUR/USD | Sell | 1.0235 | 1,000,000 | (C.BestPrice / B.BestPrice) x 1.001 | 1.02380514 | 2,000,000 |
|   |   |   |   |   |   |   |   |
| 2 | B) USD/JPY | Sell | 103.15 | 3,000,000 | (C.BestPrice / A.BestPrice) x 1.001 | 103.180752 | 1,022,386 |
|   |   |   |   |   |   |   |   |
| 3 | C) EUR/JPY | Buy | 105.50 | 2,000,000 | (A.BestPrice x B.BestPrice) / 1.001 | 105.468556 | 1,000,000 |

Figure 11

Market A Calculated Order Amount

EUR Spot

| Pmt. | Buy | Sell | Pmt. |
|---|---|---|---|
| C1 | 2,000,000 | 2,000,000 | A1 |

USD Spot

| Pmt. | Buy | Sell | Pmt. |
|---|---|---|---|
| A2 | 2,047,800 | 2,045,564.712 | B1 |

JPY Spot

| Pmt. | Buy | Sell | Pmt. |
|---|---|---|---|
| B2 | 211,000,000 | 211,000,000 | C2 |

Figure 12

Market B Calculated Order Amount

EUR Spot

| Pmt. | Buy | Sell | Pmt. |
|---|---|---|---|
| C1 | 1,000,000 | 1,000,000 | A1 |

USD Spot

| Pmt. | Buy | Sell | Pmt. |
|---|---|---|---|
| A2 | 1,023,500 | 1,022,385.89 | B1 |

JPY Spot

| Pmt. | Buy | Sell | Pmt. |
|---|---|---|---|
| B2 | 105,500,000 | 105,500,000 | C2 |

Figure 13

Market C Calculated Order Amount

EUR Spot

| Pmt. | Buy | Sell | Pmt. |
|---|---|---|---|
| C1 | 1,000,000 | 1,000,000 | A1 |

USD Spot

| Pmt. | Buy | Sell | Pmt. |
|---|---|---|---|
| A2 | 1,023,500 | 1,022,394.571 | B1 |

JPY Spot

| Pmt. | Buy | Sell | Pmt. |
|---|---|---|---|
| B2 | 105,460,000 | 105,460,000 | C2 |

Figure 14

Orders Generated By FX Arbitrage Strategy

| Market | Order # | Account # | Side | Amount | Price |
|---|---|---|---|---|---|
| A) EUR/USD Spot FX | 7 | 107 | SELL | 2,000,000 | 1.0239 |
| B) USD/JPY Spot FX | 8 | 107 | SELL | 1,022,386 | 103.19 |
| C) EUR/JPY Spot FX | 9 | 107 | BUY | 1,000,000 | 105.36 |

Figure 15
State Of Markets Following Activation Of FX Arbitrage Strategy

Market A (EUR/USD Spot FX)

| Buy Orders | | | Sell Orders | | |
|---|---|---|---|---|---|
| Order # | Amount | Price | Price | Amount | Order # |
| 1 | 1,000,000 | 1.0235 | 1.0239 | 2,000,000 | 7 |
| | | | 1.0245 | 1,000,000 | 2 |

Market B (USD/JPY Spot FX)

| Buy Orders | | | Sell Orders | | |
|---|---|---|---|---|---|
| Order # | Amount | Price | Price | Amount | Order # |
| 3 | 3,000,000 | 103.15 | 103.19 | 1,022,386 | 8 |
| | | | 103.25 | 7,000,000 | 4 |

Market C (EUR/JPY Spot FX)

| Buy Orders | | | Sell Orders | | |
|---|---|---|---|---|---|
| Order # | Amount | Price | Price | Amount | Order # |
| 9 | 1,000,000 | 105.46 | 105.50 | 2,000,000 | 6 |
| 5 | 1,000,000 | 105.40 | | | |

Figure 16

New Order Which Triggers Execution Of

FX Arbitrage Strategy

| Market | Order # | Account # | Side | Amount | Price |
|---|---|---|---|---|---|
| A) EUR/USD Spot FX | 10 | 110 | BUY | 2,000,000 | 1.0239 |

Figure 17

Trades Generated By Execution Of

FX Arbitrage Strategy

| Market | Trade # | BUY Order # | Buy Account # | SELL Order # | Sell Account # | Trade Amount | Trade Price |
|---|---|---|---|---|---|---|---|
| A) EUR/USD Spot FX | 1 | 10 | 110 | 7 | 107 | 2,000,000 | 1.0239 |
|  |  |  |  |  |  |  |  |
| B) USD/JPY Spot FX | 2 | 3 | 103 | 8 | 107 | 2,045,564 | 103.15 |
|  |  |  |  |  |  |  |  |
| C) EUR/JPY Spot FX | 3 | 9 | 107 | 6 | 106 | 2,000,000 | 105.50 |